United States Patent [19]

Beg et al.

[11] Patent Number: 4,731,690
[45] Date of Patent: Mar. 15, 1988

[54] REAL LOAD UNBALANCE PROTECTION SYSTEM FOR PARALLEL VARIABLE SPEED CONSTANT FREQUENCY ELECTRICAL POWER SYSTEMS

[75] Inventors: Mirza A. Beg, Lima; Donal E. Baker, American Township, Allen County, both of Ohio

[73] Assignee: Westinghouse Electrical Corp., Pittsburgh, Pa.

[21] Appl. No.: 938,702

[22] Filed: Dec. 5, 1986

[51] Int. Cl.$^4$ .............................................. H02H 3/26
[52] U.S. Cl. ...................................... 361/78; 361/85; 307/56; 307/86
[58] Field of Search ...................... 361/85–87, 361/78, 76, 67, 70; 307/87, 86, 58, 57, 55, 53; 323/276, 283; 363/164, 69–71

[56] References Cited

U.S. PATENT DOCUMENTS

| | | | |
|---|---|---|---|
| 3,294,976 | 12/1966 | Tipton et al. | 307/57 |
| 3,381,205 | 4/1968 | Howel et al. | 321/18 |
| 3,539,820 | 11/1970 | Kessler | 307/87 |
| 3,683,199 | 8/1972 | Billings et al. | 307/87 |
| 3,748,493 | 7/1973 | Billings et al. | 307/232 |
| 3,879,670 | 4/1975 | Fox | 329/50 |
| 4,173,774 | 11/1979 | Hyvarinen et al. | 361/87 |
| 4,342,063 | 7/1982 | Thörnell | 361/85 |
| 4,510,399 | 4/1985 | Baker | 307/57 |
| 4,520,319 | 5/1985 | Baker | 328/133 |

Primary Examiner—A. D. Pellinen
Assistant Examiner—Todd E. DeBoer
Attorney, Agent, or Firm—R. P. Lenart

[57] ABSTRACT

A method for sensing real load unbalance in an electrical power system having at least two clock based power sources which are connected for parallel operation combines a real load difference current signal, proportional to the difference in real load currents in corresponding phases of the power sources, with a phase angle signal which is proportional to the phase difference between an external clock signal and an internal clock signal of one of the power sources, to produce an error signal. When this error signal exceeds a predetermined threshold level, a trip signal is produced to indicate that an excessive real load unbalance situation exists.

5 Claims, 8 Drawing Figures

REAL LOAD UNBALANCE PROTECTION SYSTEM FOR PARALLEL VARIABLE SPEED CONSTANT FREQUENCY ELECTRICAL POWER SYSTEMS

BACKGROUND OF THE INVENTION

This invention relates to DC link variable speed constant frequency (VSCF) power systems having at least two parallel connected channels, and more particularly, to a method and circuit for protecting such systems by sensing unbalanced real current flow and producing a selective trip signal when the unbalanced real current flow reaches a predetermined level.

AC electric power systems are usually connected in parallel to increase total system rating or, in certain cases such as airborne power systems, to increase reliability. In order to further improve reliability and to maximize efficiency, it is generally desired that the total system load be divided equally among the paralleled generators. Parallel connected DC link variable speed constant frequency power sources constitute a clock based system in which a single digital clock signal is delivered to all channels whether or not they are connected to the parallel load bus. The clock signal is generally a 400 hertz squarewave. The angle between each channel Thevenin voltage and the clock signal represents an angle error. The angle error closes the feedback loop to control the channel's Thevenin angle. Synchronism is thus assured in a phase-locked loop manner. A commonly assigned patent application entitled "DC Link Variable Speed Constant Frequency Power Source Paralleling Controls", Ser. No. 938,661, and filed on the same day as the present application discloses a control system for such a power system. That application, which is hereby incorporated by reference for background material, discloses a system having a real load division loop which adds an input to a phase-locked loop clock circuit in a manner such that the phase angle is controlled to offset any real load unbalance.

Although the frequency reference signal is used as the vehicle for obtaining the desired phase angle change, the control system does not alter the steady state frequency of the output. Unlike parallel connected constant speed generators, the VSCF system does not have a frequency droop with real load errors. It has an angle droop with real load errors. VSCF systems do not exhibit frequency droop with any load conditions because the system frequency is determined totally independent of the generator speed and torque.

To this end, it is impossible to bias the VSCF over frequency/under frequency (OF/UF) protection circuits with the real load division error to get selective tripping of the parallel channels. A protection circuit which can selectively trip parallel connected DC link VSCF channels in the event of excessive real current unbalance, is therefore required.

SUMMARY OF THE INVENTION

The present invention provides a method and apparatus for protecting an electrical power system having at least two clock based power sources electrically connected for parallel operation. This protection is accomplished by producing a real load difference current signal which is proportional to the unbalanced real load current flowing in the channel output phases. That signal is combined with a phase angle signal which is proportional to the phase difference between an external clock signal and an internal clock signal in each of the power sources to produce an error signal. When that error signal exceeds a preselected threshold level, a trip signal is produced. The trip signal can then be used in well known existing circuitry to either provide isolated operation of the channels or to disconnect a particular channel.

DESCRIPTION OF THE PREFERRED EMBODIMENT

Figure 1A:
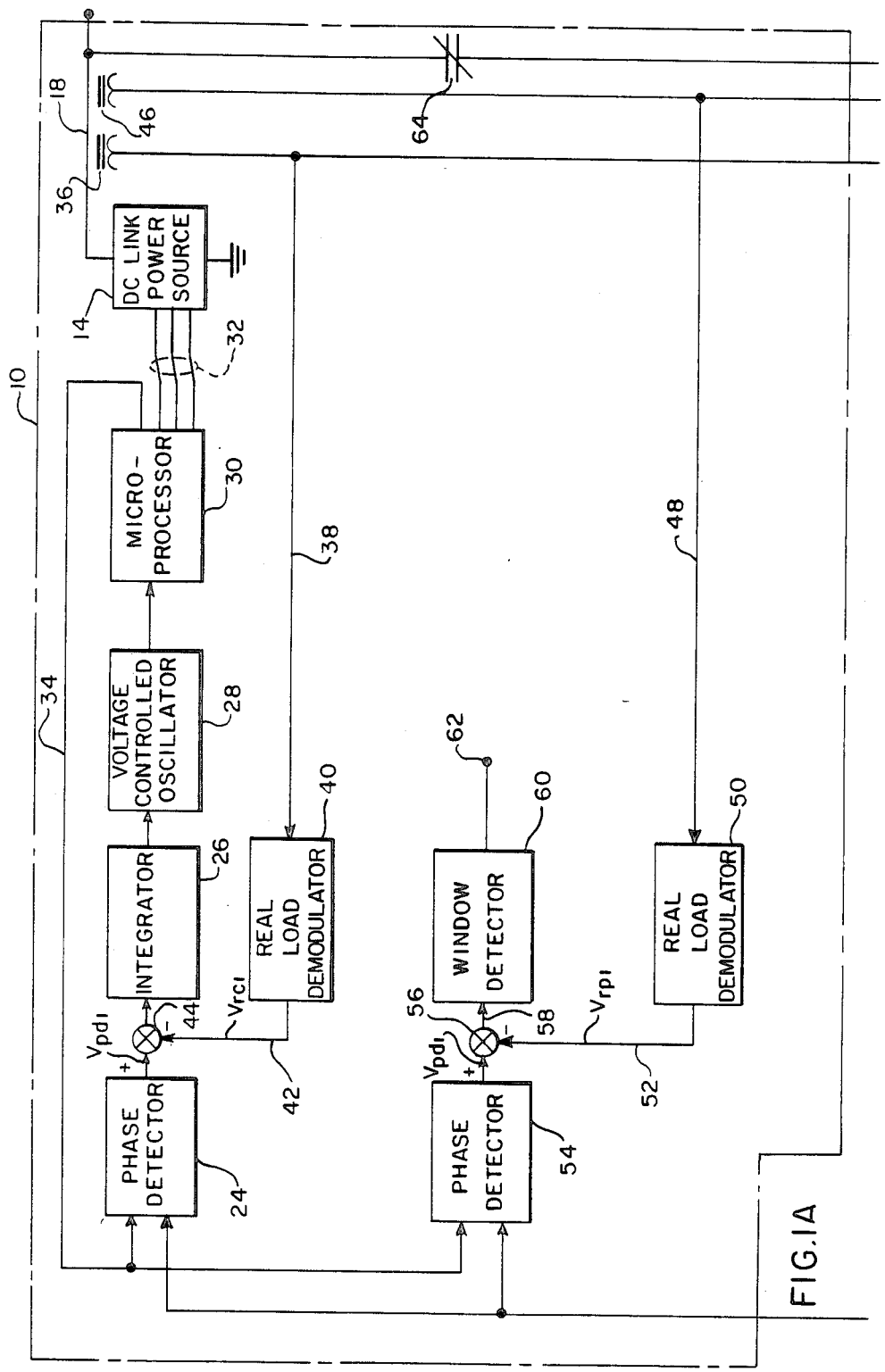
FIGS. 1A and 1B are block diagrams of a parallel connected DC link VSCF power system which includes the protection circuit of the present invention.
Figure 1B:
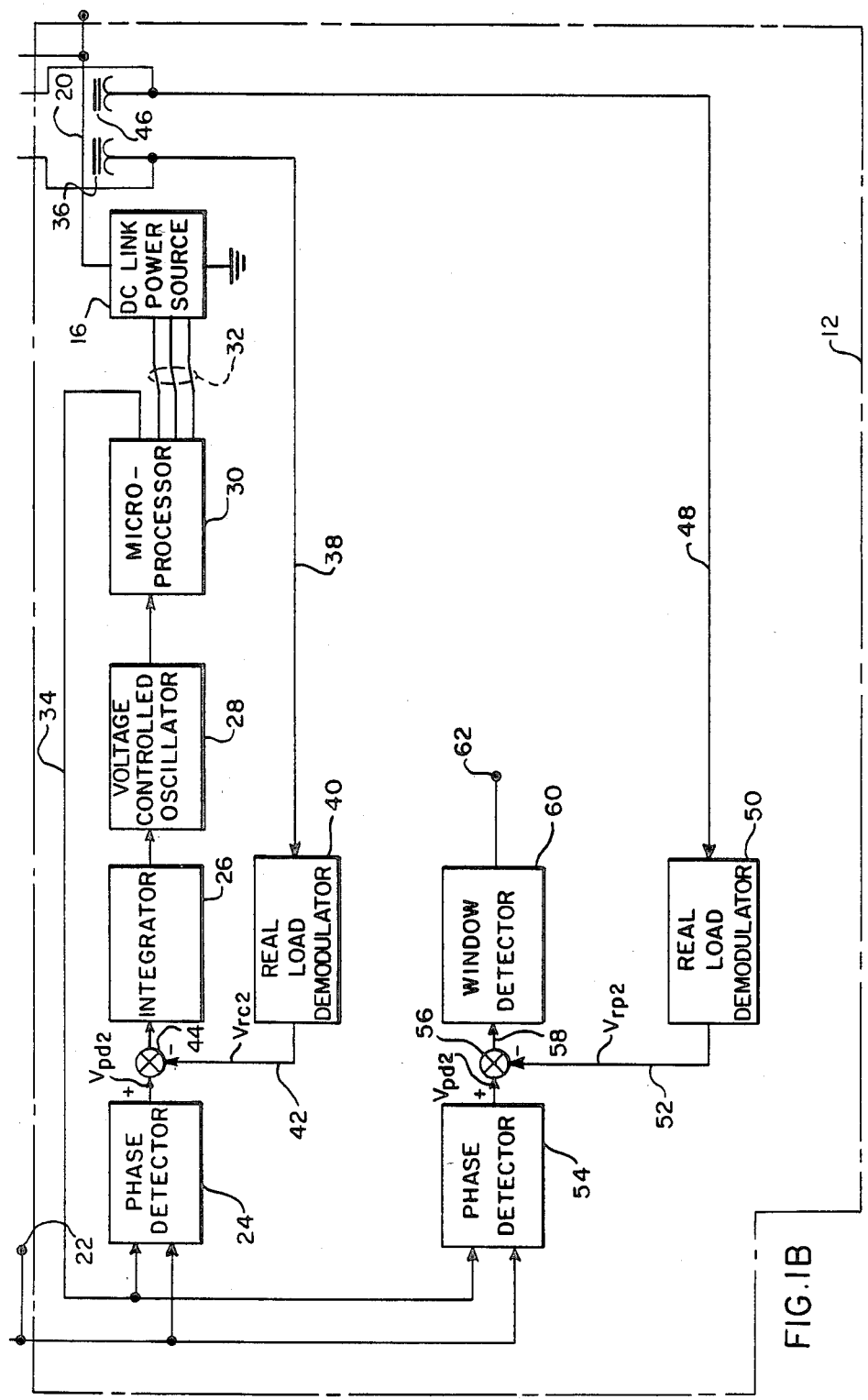

Referring to the drawings, FIGS. 1A and 1B are block diagrams of portion of a parallel connected DC link variable speed constant frequency power system having two channels 10 and 12 each including a DC link variable speed constant frequency power source 14 and 16 having output phases 18 and 20. These phases are corresponding phases of the multiple phase output of each channel. Since the control and protection circuits for each channel are identical, similar numbers will be used to identify similar components in each of the channels.

A master clock signal is supplied on terminal 22 and transmitted to a phase detector 24 in each channel. That phase detector serves as the input to a phase-locked loop which includes integrator 26 and voltage controlled oscillator 28. The output of the voltage controlled oscillator is fed to a microprocessor 30 which is located in the waveform pattern generator of the existing DC link system and produces a plurality of output pulses on lines 32 which serve to control a plurality of switching transistors in an output bridge circuit as is commonly found in existing DC link VSCF systems. That microprocessor also produces an internal clock signal on line 34 which is used to achieve phase-lock with the master clock signal. Control current transformers 36 are inductively coupled to corresponding output phases of the power sources and are electrically connected in a series loop with each other to produce a signal on line 38 which is representative of the difference or unbalanced current flowing in the output phases. A real load demodulator 40 is used to produce a voltage signal $V_{rc}$ on line 42 which is proportional to the difference in real load currents flowing in corresponding phases of the power sources. This signal is combined with a phase angle signal $V_{pd}$ in summation point 44 to minimize real current unbalances by controlling the phase relation of the Thevenin voltage of each channel with respect to the parallel bus voltage as defined by the master clock. It should be understood that although only a single output phase is illustrated for each channel in FIG. 1, the total unbalanced real load current would be sensed by sensing at least N−1 of N output phases as illustrated in the above noted coing application entitled "DC Link Variable Speed Constant Frequency Paralleling Controls", Ser. No 938,661. Therefore, $V_{rc}$ represents the total unbalanced real load current.

Protection circuitry constructed in accordance with the present invention uses protection current transformers 46 which are inductively coupled to corresponding output phases of the DC link VSCF power sources and are electrically connected in series with each other to produce a current unbalance signal on lines 48. Here again, total unbalanced real current would be sensed. Real load demodulators 50 demodulate the signal on line 48 to produce a real load current difference signal $V_{rp}$ on line 52. Phase detectors 54 receive both the master clock signal and the appropriate internal clock signal to produce a phase angle signal $V_{pd}$ which is proportional to the phase difference between the external clock signal and the internal clock signal of each power source. Each real load current difference signal $V_{rp}$ is combined with a phase angle signal $V_{pd}$ in summation point 56 to produce an error signal on line 58. Window detecting circuitry 60 determines when the error signal exceeds a preselected threshold level and then produces a trip signal on terminal 62. This trip signal can be used by well known conventional circuitry to open the contacts of a bus tie breaker 64 and thereby provide for isolated operation of the system channels. Alternatively, other switching arrangements can be used to disconnect a particular channel from the loads. U.S. Pat. No. 4,510,399, issued Apr. 9, 1985 to Baker, discloses a demodulator circuit which is suitable for use in blocks 40 and 50 in the circuit of FIGS. 1A and 1B and is hereby incorporated by reference.

Figure 2A:
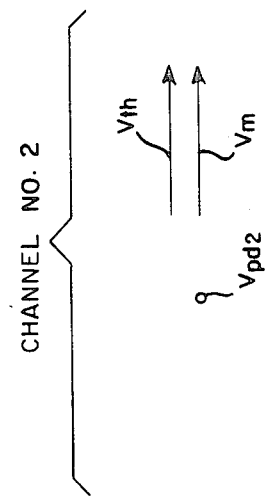
FIGS. 2A, 2B, 2C and 2D show a series of voltage vectors which are used to describe the operation of the system of FIGS. 1A and B.
Figure 2A:
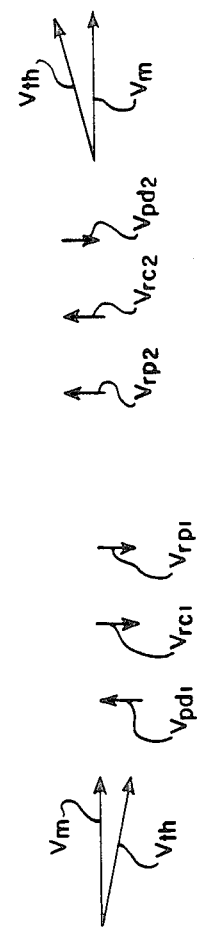
Figure 2B:
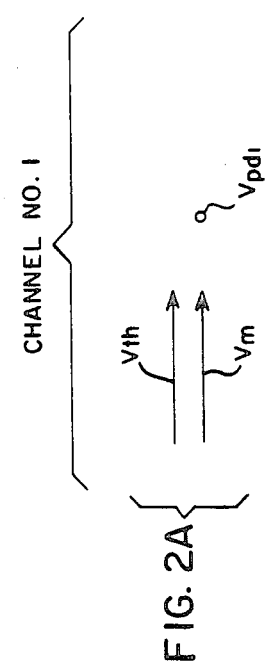
Figure 2B:
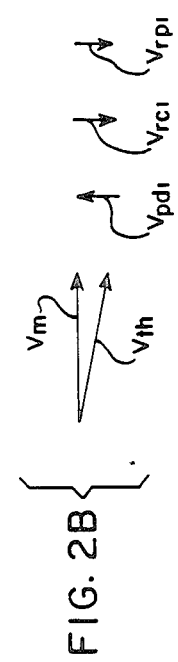

The voltage vectors of FIGS. 2A, 2B, 2C and 2D can now be used to describe the operation of the control circuit of the power system of FIGS. 1A and 1B. Consider two normally operating channels having no error associated with their real load control circuits. The preparallel condition with no phase error between the Thevenin and master voltage is shown by the vectors of FIG. 2A. In this case, the Thevenin and master voltages, $V_{th}$ and $V_m$, are in phase and the phase angle signals $V_{pd1}$ and $V_{pd2}$ are equal to zero. Now assume that an unbalance in the system exists, such as different feeder impedances or different tolerances in the control circuits of the two channels. This will result in an unbalanced load division when the two channels are initially connected in parallel. The resulting real load unbalance signal will retard the Thevenin voltage of the channel supplying more real power and advance the Thevenin voltage of the channel supplying less real power. The system will stabilize itself with some real load unbalance proportional to the gain of the real load control loop and the amount of unbalance due to feeders, etc. This situation is illustrated by the vectors of FIG. 2B. In this case, channel 1 is shown as supplying slightly more than its fair share of real load. Since there was no initial (preparallel) error in the real load control loop, each real load control loop difference current signal $V_{rc}$ is equal to each real load difference current protection loop signal $V_{rp}$. That is:

$$V_{rc1} = V_{pd1} \quad (1)$$

$$V_{rc2} = V_{pd2} \quad (2)$$

Then the protection circuit window detector does not detect any error in the real control loop at line 58, thereby indicating that the real load division loop is functioning properly.

Figures 2C, 2D:
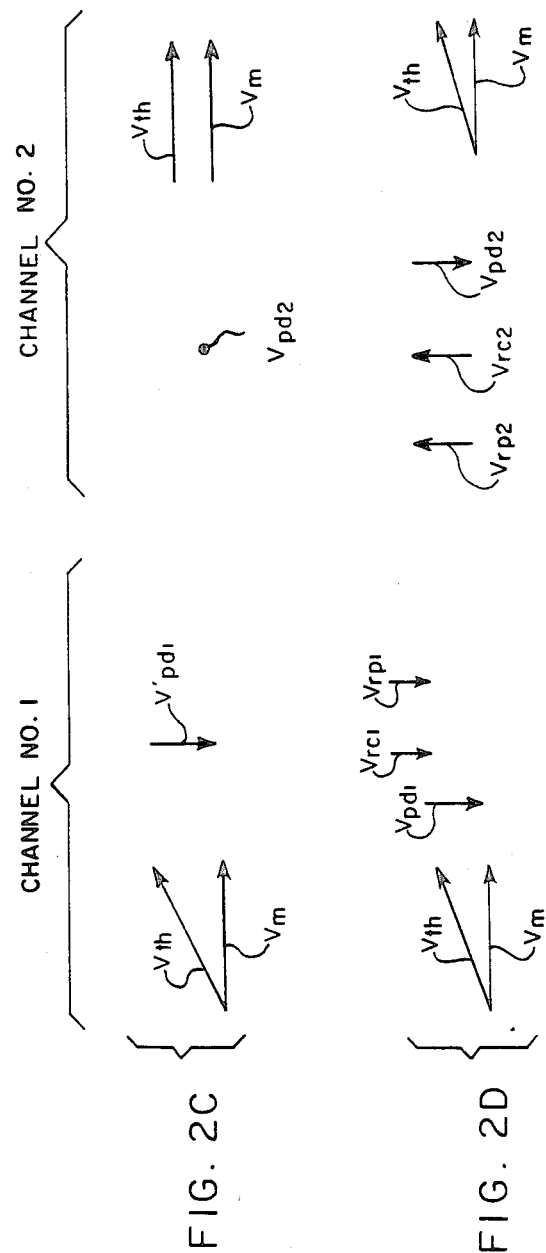

Next consider a problem in the real loop of one of the channels, say channel number 1. The preparallel condition is shown by the vectors of FIG. 2C. The problem in the real load control loop of channel number 1 as represented by phase angle signal $V_{pd1}'$ is in a direction which causes the Thevenin voltage $V_{th}$ to lead the master voltage $V_m$. Initially a large unbalanced real load division will result when the channels are paralleled. This unbalanced real load will be sensed by the control circuit which will attempt to retard the Thevenin voltage of channel 1 and advance the Thevenin voltage of channel 2. The system will finally stabilize itself with some real load unbalance proportional to the gain of the real load control loop and the unbalance due to the problem. This is illustrated by the vectors of FIG. 2D. Under these conditions:

$$V_{rc1} + V_{pd1} = V_{pd1}' \quad (3)$$

where $V_{pd1}'$ is the preparallel error. The relative magnitudes of $V_{rc1}$ and $V_{pd1}$ are related to the gains of the real load control loop and the phase-locked loop. From the vectors of FIG. 2D, it is apparent that:

$$V_{rc1} = V_{rp1} \quad (4)$$

$$V_{rc2} = V_{rp2} \quad (5)$$

$$V_{pd1} - V_{rc1} = 0 \quad (6)$$

$$V_{pd2} - V_{rc2} = 0 \quad (7)$$

Note that for channel number 1, $V_{pd}$ and $V_{rp}$ are in the same direction. The protection circuit window detector will detect the problem in channel 1 on line 58 and will isolate it from the parallel bus if the error detected exceeds the allowable level. Note that only the failed channel is detected and isolated from the parallel bus.

Figure 3:
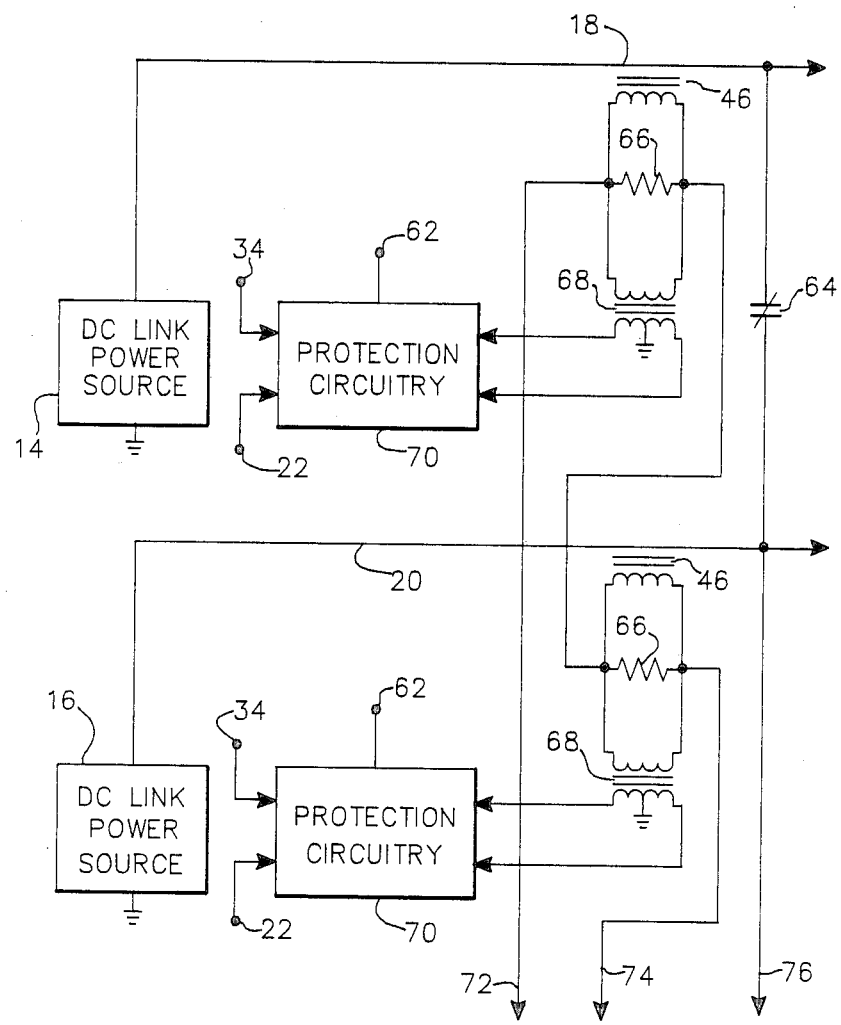
FIG. 3 is a schematic diagram of a portion of the unbalanced current sensing circuitry used in the system of FIGS. 1A and 1B.

FIG. 3 is a schematic diagram of a portion of the difference current sensing circuitry used in the system of FIG. 1. Current transformers 46 are shown to be connected in series with each other, with each current transformer being connected in parallel with a burden resistor 66. Isolation transformers 68 are used to supply the difference current signals to the protection circuitry 70 which includes demodulator 50, phase detector 54, summation point 56 and window detector 60 as illustrated in FIG. 1. Lines 72, 74 and 76 are shown to be connectable to additional power system channels if present. This sensing circuitry is used on at least $N-1$ phases of an N phase system so that total real error current will be sensed.

Figure 4:
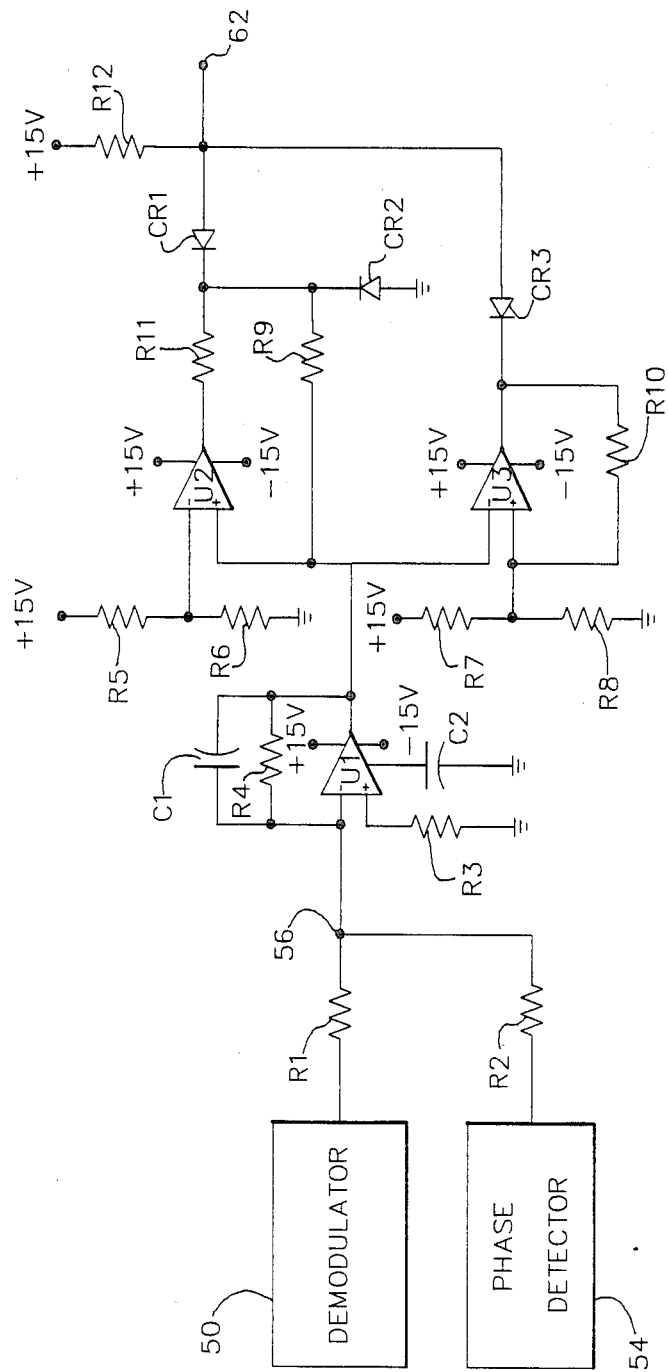
FIG. 4 is a schematic diagram of the window detector circuitry of the system of FIG. 1.

FIG. 4 is a schematic diagram which provides a detailed schematic of the window detector 60 in FIG. 1. To provide a more complete description of this embodiment, Table 1 includes a list of components used to construct the circuit of FIG. 4.

TABLE 1

| FIG. 4 Components | |
|---|---|
| U1 | HA5160 |
| U2, U3 | 3140 |
| R1 | 45K |
| R2 | 3.16K |
| R3 | 4.76K |
| R4 | 255K |
| R5 | 3.01K |
| R6, R8 | 1.82K |

TABLE 1-continued

| FIG. 4 Components | |
| --- | --- |
| R7 | 4.67K |
| R9 | 10 M |
| R10 | 200K |
| R11 | 4.99K |
| R12 | 10K |
| C1 | 2 μf |
| C2 | 30 pf |
| CR1, CR2, CR3 | 1N647 |

Although the present invention has been described in terms of what is at present believed to be its preferred embodiment, it will be apparent to those skilled in the art that various changes may be made without departing from the scope of the invention. It is therefore intended that the appended claims cover such changes.

What is claimed is:

1. A real load unbalance sensing and protection circuit for an electric power system in which at least two clock based power sources are connected for parallel operation, said circuit comprising:

means for producing a real load difference current signal proportional to the difference in real load currents of the power sources;

means for producing a phase angle signal proportional to the phase difference between an external clock signal and an internal clock signal of a first one of said power sources;

means for combining said real load difference current signal and said phase angle signal to produce an error signal; and means for producing a trip signal when said error signal exceeds a preselected threshold level.

2. A circuit as recited in claim 1, wherein said means for producing a current signal comprises:

means for monitoring the total difference current flowing in electrically connected output phases of each of said power sources, to produce a total difference current signal; and means for demodulating said total difference current signal to produce said real load difference current signal.

3. A circuit as recited in claim 2, wherein said means for monitoring the total difference current comprises:

a plurality of current transformers, each of said transformers being inductively coupled to an output phase of one of said power sources;

said transformers which are coupled to connected ones of said output phases being electrically connected in series with each other; and each of said transformers being electrically connected in parallel with a resistor.

4. A method of sensing real load unbalance in an electrical system having at least two clock based power sources which are connected for parallel operation, said method comprising the steps of:

producing a real load difference current signal proportional to the difference in real load currents of the power sources;

producing a phase angle signal proportional to the phase difference between an external clock signal and an internal clock signal of a first one of said power sources;

combining said real load difference current signal and said phase angle signal to produce an error signal; and producing a trip signal when said error signal exceeds a preselected threshold level.

5. The method of claim 4, wherein the step of producing a real load difference current signal comprises the steps of:

monitoring the total difference current flowing in electrically connected output phases of each of said power sources, to produce a total difference current signal; and demodulating said total difference current signal to produce said real load difference current signal.

* * * * *